Oct. 9, 1951 C. R. TURNER 2,570,993
PRESSURE COOKER
Filed May 27, 1946 2 Sheets-Sheet 2
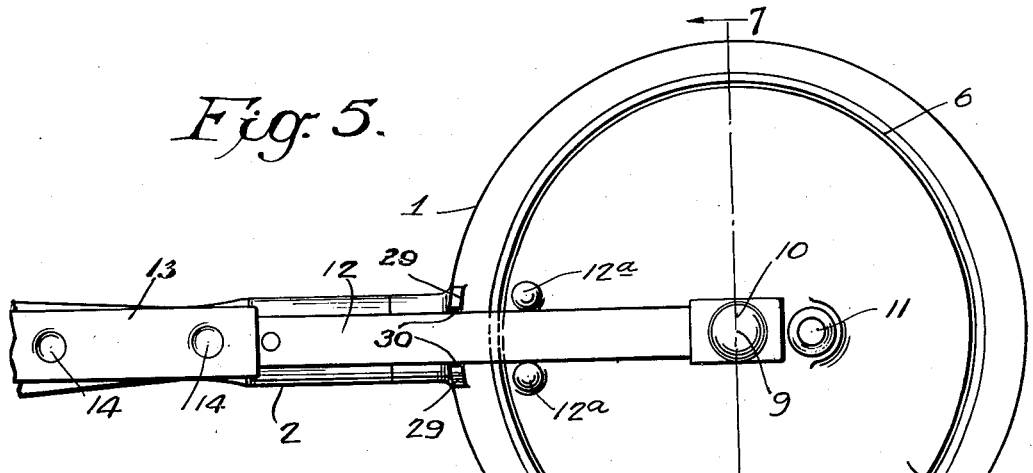
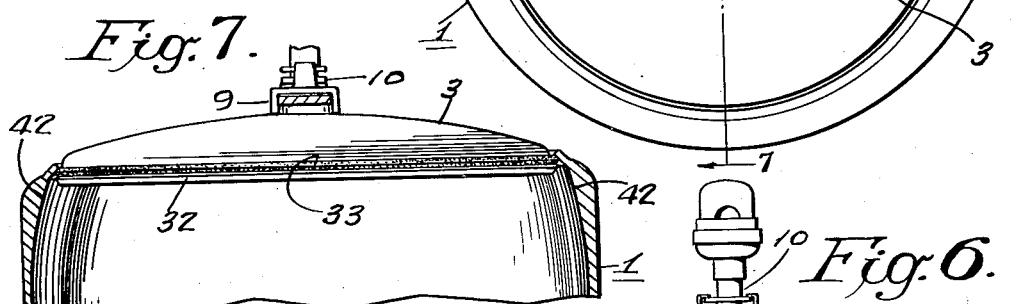
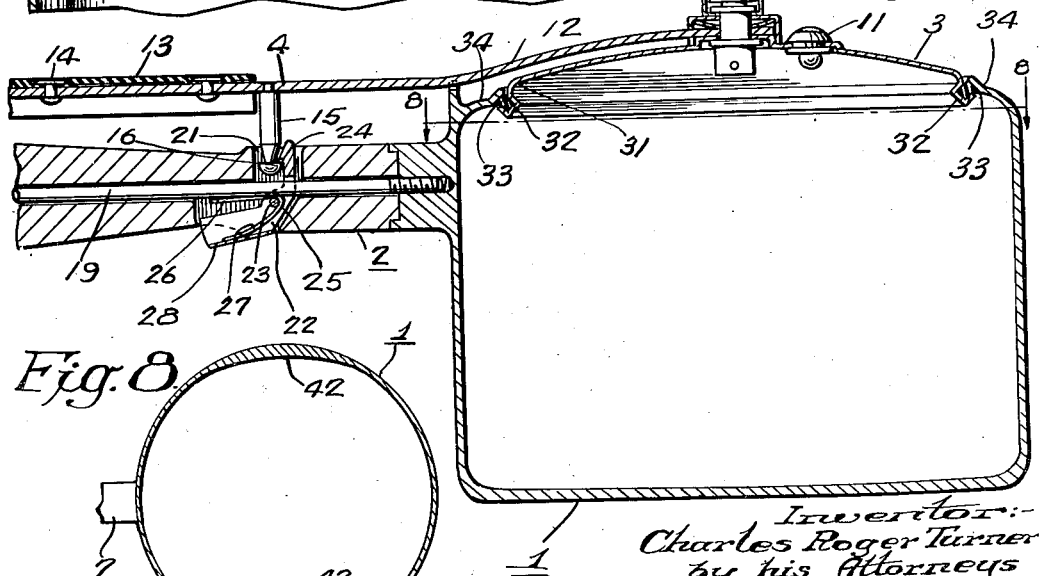
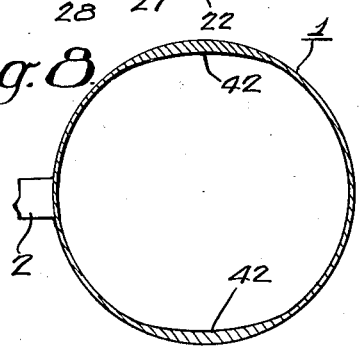
Inventor:-
Charles Roger Turner
by his Attorneys
Howson + Howson Patented Oct. 9, 1951

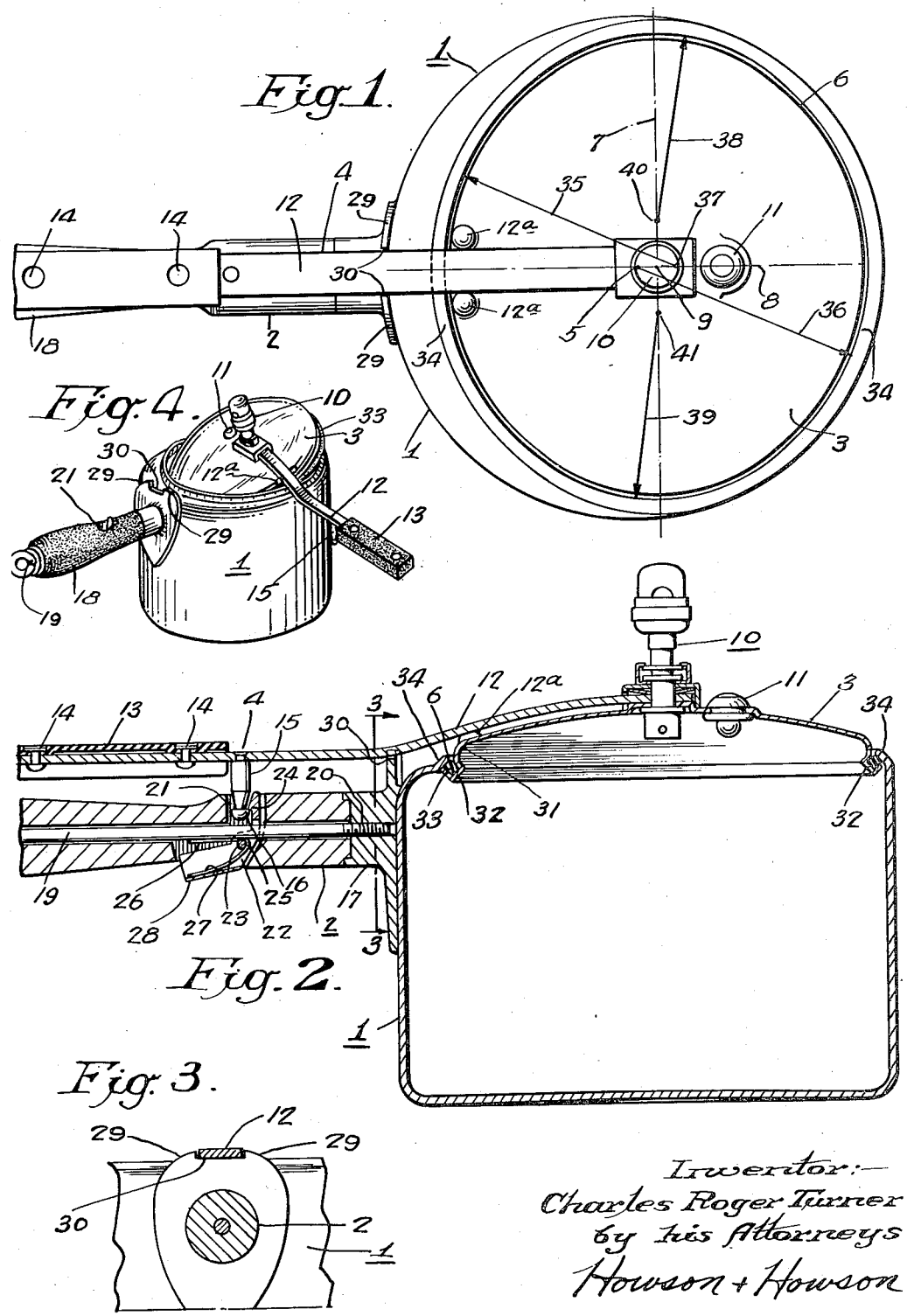

2,570,993

UNITED STATES PATENT OFFICE 2,570,993

PRESSURE COOKER

Charles Roger Turner, Enfield, Springfield Township, Montgomery County, Pa., assignor to Proctor Electric Company, Philadelphia, Pa., a corporation of Pennsylvania Application May 27, 1946, Serial No. 672,363

2 Claims. (Cl. 220—56)

This invention relates to pressure cookers, and more particularly to a novel construction for facilitating the application and removal of the lid or cover of such a cooker. The invention further relates to the type of pressure cooker in which the cover or lid seats upwardly in the opening in the cooking vessel so that the lid cannot be removed while a substantial pressure exists within the cooker.

In a pressure cooker of this type, it is necessary to provide some form of lid which may be inserted through the vessel opening and which will seat upwardly against the inner surface of the vessel surrounding said opening. The simplest way of accomplishing this is to make the vessel opening and the lid of elliptical or oblong shape so that the lid may be inserted by placing it in a certain position and then turning it. It is also necessary to have some provision for securing the lid handle to the vessel handle when the lid is in place, and in the past it has been the practice to provide a manually operable clasp for this purpose.

Thus, it is necessary for the user to perform the necessary manipulations during application and removal of the lid. Prior cookers of this type have been objectionable in that it has been difficult for the user to seat the lid properly and to operate the handle clasping means.

One object of the invention is to provide an improved pressure cooker which may be closed and opened with the utmost ease and with a minimum of manipulation on the part of the user.

Another object of the invention is to provide a pressure cooker having novel provision for piloting or guiding the lid or cover into proper position with respect to the cooking vessel.

A further object of the invention is to provide a pressure cooker construction which assures proper positioning of the lid or cover.

Another object of the invention is the provision of a pressure cooker of the type mentioned, from which food may be poured with a minimum of hindrance by the inwardly extending top lip of the vessel.

Other objects and features of the invention will be apparent from the following detailed description with reference to the accompanying drawings illustrating certain embodiments of the invention.

In the drawings,

Fig. 1 is a plan view of one embodiment of the novel pressure cooker;

Fig. 2 is a sectional view taken on a plane through the handle structure;

Fig. 3 is a sectional detail view taken along line 3—3 of Fig. 2;

Fig. 4 is a perspective view illustrating the application of the lid;

Fig. 5 is a plan view of another embodiment of the pressure cooker;

Fig. 6 is a sectional view taken on a plane through the handle structure;

Fig. 7 is a detail sectional view taken along line 7—7 of Fig. 5; and

Fig. 8 is a small-scale sectional view taken on line 8—8 of Fig. 6.

Referring first to Figs. 1 and 2, the pressure cooker shown comprises a vessel 1 having a handle 2, and a lid or cover 3 having a handle 4. The wall of vessel 1 is of cylindrical form, the center line or axis thereof being located at the point designated 5 in Fig. 1. The vessel has an elliptical top opening 6 whose major elliptical axis is represented in Fig. 1 by the dot and dash line 7, and whose minor elliptical axis is represented by the dot and dash line 8. It will be noted that the center 9 of the elliptical opening 6 is offset from axis 5 of the cylindrical vessel wall in the direction of the minor elliptical axis of the opening 6. The vessel handle 2 extends from the vessel 1 substantially in the direction of the minor elliptical axis of the opening 6. The reasons for the construction just described will be apparent later.

The lid or cover 3 is of elliptical form corresponding to the elliptical opening 6, and is adapted to seat upwardly in the vessel opening 6, as shown in Fig. 2. The lid handle 4 extends from the lid substantially in the direction of the minor elliptical axis of the lid. Consequently, when the lid is in place, its handle 4 is disposed above and aligned with the vessel handle 2.

On the lid 3 there are preferably provided a pressure control valve 10 and an automatic venting device 11, which form the subject of copending application Serial No. 674,707, filed June 6, 1946. Since the present invention is not concerned with these devices, it is unnecessary to describe them in detail.

Referring specifically to the handle structures and their attachments, the lid handle 4 may comprise a metallic member 12 having one end secured to the lid at the central portion thereof. Assuming that the pressure control valve 10 is employed and is located centrally of the lid, the handle member 12 may be secured to the lid by means of the valve assembly, as shown in Fig. 2. However, it will be apparent that the handle member could be secured to the lid by means of a rivet or in any other suitable manner. A pair of protuberances 12a on the lid prevent turning of the handle and prevent jamming of the inwardly projecting top lip of the vessel between the lid and the lid handle while the lid is being inserted or removed as hereinafter described. At the free end of the metallic member 12, there may be provided a non-metallic handle member 13, of low heat conductivity, secured to member 12 as by rivets 14. Also secured to the handle member 12 is a depending latching stud 15 whose lower end is formed to provide a shoulder 16.

The vessel handle 2 comprises a metallic bracket or support 17, secured to vessel 1 in any suitable manner such as by spot welding, and a non-metallic handle member 18, of low heat conductivity, secured to bracket 17 by a center rod 19 whose end 20 threadedly engages the bracket 17. The handle member 18 has an opening 21, into which the latching stud 15 is adapted to extend, as shown in Fig. 2. The opening 21 and stud 15 constitute an indexing means which prevents latching of the lid handle unless the lid is in proper position. Within the handle member 18 there is provided a latch member 22 which is pivoted at 23 and which has a nose portion 24 adapted to engage the shoulder 16 on the latching stud 15 when the latter is disposed in opening 21. The latch member 22 is urged toward latching position, i. e. counter-clockwise as viewed in Fig. 2, by a spring 25 which extends about the pivot pin 23. The end portion 26 of the spring rests against rod 19, while the end portion 27 engages a tripping element or extension 28 of the latch member 22. It will be noted that the element 28 extends from the lower side of the vessel handle, so that the latch member 22 may be tripped by actuating element 28 while holding on to the handles. When the lid is applied to the vessel, as hereinafter described, the handles are latched together merely by exerting gripping pressure thereon. With the latch means operative, the lid is seated firmly in place.

The upper portion of bracket 17 serves as a piloting and indexing means for the lid through the medium of the lid handle. To this end, the upper portion of the bracket is extended and has curved edges 29 (see Fig. 3) and a recess 30 adapted to receive the lid handle.

As previously mentioned, the lid 3 is adapted to seat upwardly in the vessel opening 6. As shown in Fig. 2, the edge portion of the lid extends downwardly at 31 and is shaped to form a peripheral channel 32 in which a resilient element 33 is disposed. The element 33 may be formed of rubber or the like, and it is adapted to form a tight seal with the inwardly extending edge 34 surrounding the vessel opening 6. Preferably, the edge 34 is disposed at an angle and the cooperating portion of the lid is similarly arranged for a reason which will appear presently.

The advantages of the cooker structure hereinbefore described may be clearly seen by considering the use of the device. Let us assume that the lid is detached from the vessel, and that the user is about to apply the lid preparatory to placing the cooker in operation. The lid is first positioned just above the vessel opening 6 with the lid handle 4 extending substantially at right angles to the vessel handle 2. In this position, the lid may be partially inserted by tipping it at a slight angle, as shown in Fig. 4, and it may then be fully inserted and brought into proper position by rotating the lid handle toward the position of alignment with the vessel handle. Due to the offset of the vessel opening 6 with respect to the axis of the cylindrical vessel wall, the interior wall surface is effective to pilot the lid as the latter approaches its proper position. This is due to the fact that the offset feature causes the effective wall areas to be closer to the edge portions of the lid at the two extremities of the major axis of the lid. As the lid handle is rotated, it engages one of the curved edges 29 which pilots it into the recess 30. At the same time the latching stud 15 enters the opening 21 in the vessel handle. Thus the combined lid and handle unit is piloted and indexed in proper position with no effort on the part of the user other than turning the handle. When the lid has been brought into proper position, the user has only to grip the two aligned handles to cause latching thereof. The cooker is then ready for operation.

After the cooker has been used and the pressure therein has been reduced so that the lid may be removed, the user merely trips the latch member 22, raises the lid handle sufficiently to free it from the vessel handle, and then rotates the vessel handle to a position substantially at right angles to the vessel handle. The lid may then be removed simply by tilting it slightly and lifting it to withdraw it completely from the vessel.

It should be noted that the offset of the vessel opening 6 makes it possible to use a longer elliptical lid in a given size vessel, because such offset provides sufficient clearance so that the lid may be inserted, as in Fig. 4, with a minimum of tilting. Moreover, the use of the longer lid reduces the width of the inwardly extending lip 34 at the extremities of the major elliptical axis of the vessel opening 6. This reduction in the width of the lip at the point where the contents of the vessel are normally poured therefrom makes it easier for the user to pour out the contents after the cooker has been used. The incline of the lip 34 further facilitates pouring of the vessel contents, as will be readily apparent.

Referring again to Fig. 1, the elliptical shape of the vessel opening and the lid is preferably obtained by striking certain arcs as indicated by the arrowhead lines. The side portions of the elliptical form are obtained by striking arcs as indicated by lines 35 and 36. One arc is struck from point 5 as a center so that a portion of the elliptical form is concentric with the vessel wall. The other arc is struck from point 37 as a center, which point is spaced from point 9 the same distance as is point 5. The end portions of the elliptical form are obtained by striking arcs, as indicated by lines 38 and 39, from points 40 and 41 which are equally spaced from point 9 along the major elliptical axis. This construction has the advantage that a greater portion of the vessel wall is effective to pilot the lid.

In Figs. 5 to 8 there is shown a modified form of the cooker which has some of the advantages above mentioned. The elements corresponding to those of the first-described embodiment are similarly designated and require no further description. In this instance, however, certain of the results achieved by the offset feature of the first-described embodiment are achieved in a different manner. The center point 9 of the elliptical opening 6 coincides with the central axis of the vessel, and the upper portion of the vessel wall is internally thickened in the areas adjacent the extremities of the major elliptical axis of the vessel opening. This thickening of the wall is shown in Figs. 7 and 8 at 42. The result of this is that the upper portion of the internal wall surface of the vessel is caused to be elliptical or oblong in the direction of the minor elliptical axis of the vessel opening. The thickened wall areas serve to pilot the lid, and also reduce the lip 34, making it easier to pour the vessel contents.

While the word "elliptical" has been used in the foregoing description, and also appears in the appended claims, it is to be understood that this term is used in a general sense to designate an oblong shape, and not in the strict geometrical sense to mean that true ellipses are necessarily involved.

Although the invention has been described with specific reference to the illustrated embodiments, it is not limited thereto but is susceptive to further embodiments and modifications without departing from its scope.

I claim:

1. In a pressure cooker, a vessel having an elliptical top opening and an inturned lip about said opening, a handle secured to said vessel near the top thereof and extending from the vessel substantially in the direction of the minor axis of said opening, an elliptical lid or cover adapted to seat upwardly in said opening against said lip, a handle secured to said lid and extending therefrom substantially in the direction of the minor axis of the lid, the lid being insertable in place by tipping it partially into the vessel with the handles misaligned and then rotating the lid until the two handles are aligned, the top portion of the vessel wall adjacent the ends of the major axis of said elliptical opening being thickened inwardly so that the upper interior wall surface of the vessel adjacent the ends of the major axis of said opening is in close proximity to the opening so as to pilot the lid into proper position in relation to said opening, and said lip consequently is narrow at the ends of the major axis of said opening, thus facilitating pouring of the vessel contents, and means for latching the lid handle to the vessel handle when the lid is in proper position in relation to said opening.

2. In a pressure cooker, a vessel having an elliptical top opening and an inturned lip about said opening, a handle secured to said vessel near the top thereof and extending laterally from the vessel, an elliptical lid or cover adapted to seat upwardly in said opening against said lip, a handle secured to said lid and extending therefrom so as to be aligned with the vessel handle when the lid is in the vessel-closing position, the lid being insertable in place by tipping it partially into the vessel with the handles misaligned and then rotating the lid until the two handles are aligned, the top portion of the inner surface of the side wall of the vessel being of elliptical shape and having its major axis at right angles to the major axis of said elliptical opening, so that the upper inner surface of the side wall of the vessel adjacent the ends of the major axis of said opening is in close proximity to the opening so as to pilot the lid into proper position in relation to said opening, and said lid consequently is narrow at the ends of the major axis of said opening, thus facilitating pouring of the vessel contents, and means for latching the lid handle to the vessel handle when the lid is in closing position in relation to said opening.

CHARLES ROGER TURNER.

REFERENCES CITED

The following references are of record in the file of this patent:

UNITED STATES PATENTS

| Number | Name | Date |
| --- | --- | --- |
| D. 146,234 | Russell | Jan. 14, 1947 |
| 737,171 | Szentjanossy | Aug. 25, 1903 |
| 1,219,402 | Rutan | Mar. 13, 1917 |
| 2,282,011 | Vischer, Jr. | May 5, 1942 |
| 2,407,627 | Chandler | Sept. 17, 1946 |
| 2,468,259 | Foster | Apr. 26, 1949 |

FOREIGN PATENTS

| Number | Country | Date |
| --- | --- | --- |
| 310,852 | Great Britain | Aug. 1, 1930 |
| 630,277 | France | Aug. 16, 1927 |